R. R. PARKER.
Necktie-Shield.

No. 160,117. Patented Feb. 23, 1875.

UNITED STATES PATENT OFFICE.

REGINALD R. PARKER, OF INDIANAPOLIS, INDIANA.

IMPROVEMENT IN NECK-TIE SHIELDS.

Specification forming part of Letters Patent No. 160,117, dated February 23, 1875; application filed October 3, 1874.

*To all whom it may concern:*

Be it known that I, REGINALD R. PARKER, of Indianapolis, Marion county, Indiana, have invented an Improvement in Scarfs, Neck-Ties, &c., of which the following is a specification:

The invention consists in providing the shield with a strap-loop for receiving a neck-tie and button-loop, as hereinafter described.

Figure 1:
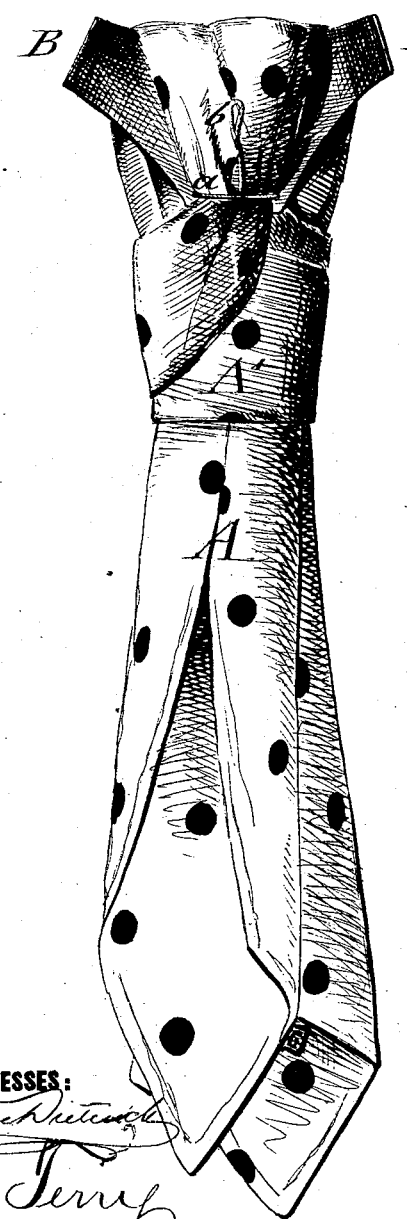
Figure 2:
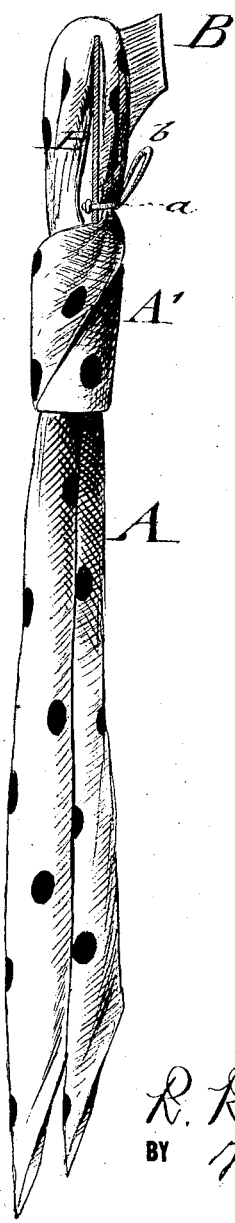

Figure 1 is a rear, and Fig. 2 a side elevation, the latter in section.

A represents the neck-tie, and B the shield, while $a$ is an elastic strap-loop, and $b$ a button-hole loop, forming part of the shield, as clearly shown in Fig. 2 of the drawing.

What I claim is—

As a new article of manufacture, a neck-tie shield provided with elastic strap-loop $a$ and button-loop $b$, when combined and arranged substantially as shown and described.

R. R. PARKER.

Witnesses:
A. DUNLOP,
R. M. SHADE.